United States Patent [19]

Martin

[11] 3,975,067

[45] Aug. 17, 1976

[54] BEARING ASSEMBLIES

[75] Inventor: Jacques Lucien Joseph Martin, Paris, France

[73] Assignee: R.K.S., France

[22] Filed: May 14, 1974

[21] Appl. No.: 469,635

[30] Foreign Application Priority Data

June 8, 1973   France ............................ 73.21147

[52] U.S. Cl. ........................... 308/216; 29/148.4 R; 308/195
[51] Int. Cl.² ..................... F16C 33/58; F16C 33/64
[58] Field of Search .......... 308/216, 195, 196, 188, 308/202, 235, 237 R, 239; 29/148.4 R, 148.4 C

[56]            References Cited
               UNITED STATES PATENTS

| 1,728,999 | 9/1929 | Kuylenstierna | 308/216 |
| 2,245,084 | 6/1941 | Wood | 308/237 R |
| 2,382,975 | 8/1945 | Coddington | 308/235 |
| 2,759,243 | 8/1956 | Smith | 308/196 X |
| 3,208,804 | 9/1965 | Stenert et al. | 308/216 X |
| 3,332,728 | 7/1967 | Gibson | 308/216 X |

FOREIGN PATENTS OR APPLICATIONS 590,163   7/1947   United Kingdom ................ 308/235

*Primary Examiner*—L. J. Paperner
*Assistant Examiner*—Randolph A. Reese
*Attorney, Agent, or Firm*—Stevens, Davis, Miller & Mosher

[57]              ABSTRACT

A double contact, crossed roller or ball bearing assembly with roller paths inserted in supports made from another material in which each support has a single groove per row for balls or roller members and has mounted by deformation therein a single open ring formed from a bearing steel section having two enlarged portions joined by a thinner axial rib. The two bearing surfaces of each roller path are machined in the two enlarged portions of each ring.

2 Claims, 5 Drawing Figures

BEARING ASSEMBLIES

The present invention relates to roller or ball bearings whose roller paths comprise metal members inserted in ball race bodies made from a less hard metal, usually a light alloy, particularly in the case of large bearings.

Bearings of this type are already known wherein the roller paths are formed by "rings" which are split to permit assembly and are inserted in grooves within which they are immobilized by any appropriate means. Generally these are multiple contact bearings and each ball race has two roller paths formed in the indicated manner by means of two separate rings. These rings are produced from wires or sections made from steel which can be cold hammered but not tempered and they are given an annular shape in their support before making their bearing surface by cold hammering without grinding.

This leads to a reduced load capacity as compared with bearings of conventional design because untempered roller paths are much less hard than those of conventional ball races. In addition, the kinematics are generally poor because the geometry of the bearing surfaces obtained by cold hammering is to a considerable extent dependent on the geometrical quality of the grooves cut into the supports.

Therefore, it is one object of the present invention to provide bearings with inserted paths of the above-described type but which do not have the indicated disadvantages, i.e., retaining the advantages of lightness and simplicity of construction of bearings with inserted paths but whose paths simultaneously have a hardness and precision comparable to those of conventional bearings.

The present invention comprises making a single groove in each support and introducing thereinto a single ring whose cross-section has two enlarged portions connected by a thin portion or "axial rib". The ring has an axial gap in order to permit its assembly, whereby the ring is formed by bearing steel which has been tempered on the surface or throughout and the bearing surfaces of one and the same ring are ground symmetrically by holding the ring in an appropriate mounting.

Other features of the invention can be gathered from the following description of two embodiments taken as non-limiting examples and shown in the attached drawing in which.

Figure 1:
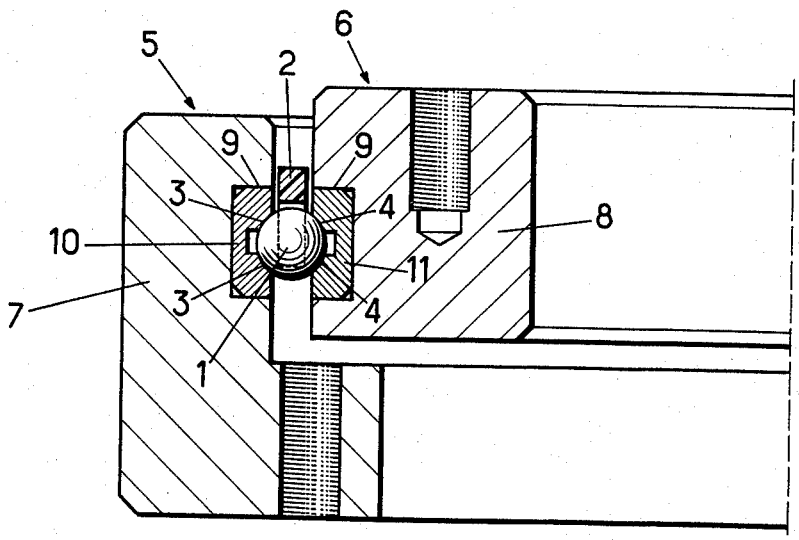
FIG. 1 is a partial axial section of a bearing with inserted roller paths.

FIG. 1 shows part of a conventional double contact ball bearing which withstands the axial and radial forces as well as the reversing torques. It has a single ball race 1 mounted in cage 2, whereby the roller paths of both the inner and outer ring each has two bearing surfaces, respectively 3 and 4.

Figure 3:
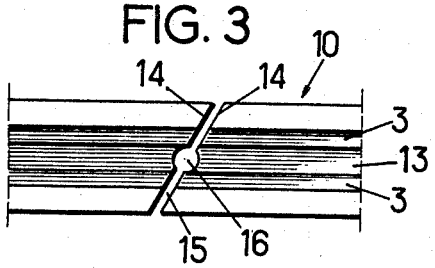
FIG. 3 is a view of the inside of a small portion of the path of FIG. 2 showing the connection in detail.
Figure 2:
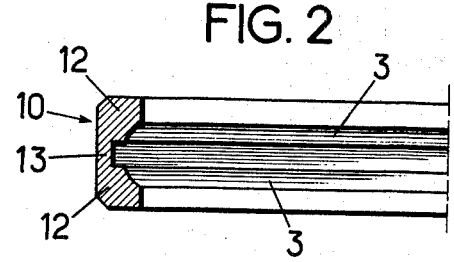
FIG. 2 shows a detail of the outer inserted roller path corresponding to the embodiment of FIG. 1.

According to the invention the outer bearing ring 5 and the inner ring 6 each comprises a support 7 or 8 made from a random material in which is machined a groove 9 for the insertion of a roller path 10 or 11 which radially extends into its respective support 7 or 8 as is illustrated in FIG. 1. Each of these paths comprise an open ring made from a bearing steel section having the cross-section shown in FIG. 2, i.e. having two enlarged portions 12 joined by a thin portion 13 called the axial rib. The connection of the two ends of the section in the open part of the ring is effected, as shown in FIG. 3, by oblique gaps 14 which facilitate the passage of rolling members 1 and leave between them a clearance 15 which is sufficient to permit the assembly of the ring in its groove 9 by deformation and also the free expansion of the two members 7 and 10 (or 8 and 11) which are generally made from a different material.

The ring thus produced is tempered on the surface or throughout with respect to bearing surfaces 3 or 4. It is held in a circular mounting in order to enable the surfaces to be ground to their precise profile with an exact concentricity and spacing. This is only possible due to the use of a single ring whose two portions 12 are joined by rib 13, as opposed to the case of bearings with conventional separate rings where such a grinding process would lead to a precision which could not be retained during the assembly of the rings.

Both in the case of inner ring 6 and outer ring 5, the ring roller paths 10 and 11 can be inserted in groove 9 without any other fixing means, except possibly a rotation-preventing lug combined with an oil hole 16 drilled so as to straddle gap 15.

Figure 5:
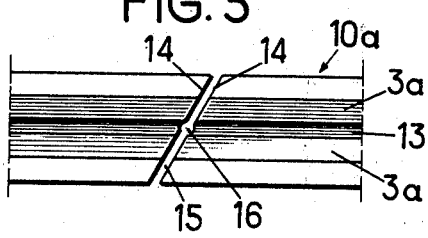
FIGS. 4 and 5 are views corresponding to FIGS. 2 and 3 in the case of a bearing with crossed cylindrical rollers.
Figure 4:
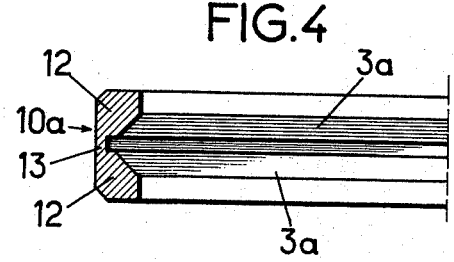

As a variant by the same process bearings of the same type can be produced whose rolling members are no longer balls 1 but instead crossed cylindrical rollers of conventional type. Then, as shown in FIGS. 4 and 5 the bearing surfaces 3a of each roller path such as 10a are planar on the section, i.e. conical when the latter is shaped, while the remainder is unchanged.

As a result of the invention it is possible to obtain bearings whose roller paths have the hardness and precision of conventional bearings, which guarantees a high load capacity and long life, together with a completely regular operation, while using supports 7 or 8 made from a random material. These supports can for example be made from ordinary steel or preferably, in the case of large bearings where there is a weight problem from a light alloy or even a plastic material.

In this way an extremely light assembly is obtained having a high load capacity and long life, as well as being relatively cheap due to the ease of assembly and the small amount of bearing steel used for making the roller paths.

Obviously, the above embodiment is not intended to limit the scope of the invention and all desirable modifications can be made thereto without passing beyond the scope of the invention.

What is claimed is:

1. A double contact roller or ball bearing assembly comprising:
    two supports one of which has an inner cylindrical surface and the other an outer cylindrical surface, said two cylindrical surfaces having different diameters and said inner cylindrical surface being disposed concentrically within said outer cylindrical surface, said inner cylindrical surface comprising an annular groove extending radially outwardly and said outer cylindrical surface comprising an annular groove extending radially inwardly,
    two elastic rings each opened by a single oblique gap, mounted by elastic deformation the one into said outwardly extending groove and the other into said inwardly extending groove, each of said rings being formed from a bearing steel section comprising two enlarged portions joined by a thinner axial rib, each of the two enlarged portions of each ring forming one of the two roller or ball paths forming together the double contact bearing surface of each ring, each ring being tempered on its entire bearing surface turned toward the bearing surface of the other ring, the ring mounted into the inwardly extending groove of said outer cylindrical surface having an inner circumference smaller than the circumference of said groove at the bottom thereof, but greater than the circumference of said outer cylindrical surface, and the ring mounted into the outwardly extending groove of said inner cylindrical surface having an outer circumference greater than the circumference of said groove at the bottom thereof, but smaller than the circumference of said inner cylindrical surface, said two supports being made from a material less hard than the bearing steel of said open rings.

2. A method of manufacturing a double contact crossed roller or ball bearing assembly, comprising the steps of:

forming two open elastic rings of different diameters respectively from a bearing steel section with oblique ends comprising two enlarged portions joined by a thinner axial rib, said enlarged portions being turned outwardly on the ring of smaller diameter and inwardly on the ring of greater diameter, tempering said two open rings on the entire surface of the enlarged portions thereof, machining double contact roller or ball paths in said two enlarged portions of each of said rings while each of said rings is secured in a circular mounting, forming two supports from material less hard than the bearing steel, forming on one of said supports an inner cylindrical surface with a diameter greater than the inner diameter of said ring of greater diameter and on said other support an outer cylindrical surface with a diameter greater than the outer diameter of said ring of smaller diameter, forming radially outwardly in said inner cylindrical surface a single annular groove with a diameter at its bottom greater than the outer diameter of said ring of greater diameter and radially inwardly in said outer cylindrical surface a single annular groove with a diameter at its bottom greater than the inner diameter of said ring of smaller diameter, and mounting by elastic deformation said ring of smaller diameter into said inwardly extending groove and said ring of greater diameter into said outwardly extending groove.

* * * * *